United States Patent [19]

Sugitani et al.

[11] Patent Number: 4,988,201
[45] Date of Patent: Jan. 29, 1991

[54] APPARATUS FOR DETECTING A SHAPE OF A GROOVE

[75] Inventors: Yuji Sugitani; Yoshihiro Kanjo; Takanori Nishimura, all of Tokyo, Japan

[73] Assignee: NKK Corporation, Tokyo, Japan

[21] Appl. No.: 242,345

[22] Filed: Sep. 1, 1988

[51] Int. Cl.$^5$ .............................................. G01B 11/24
[52] U.S. Cl. ................................. 356/376; 219/124.34; 358/101; 358/107
[58] Field of Search .................... 356/376; 219/124.34; 358/101, 107

[56] References Cited

FOREIGN PATENT DOCUMENTS

| 26706 | 2/1982 | Japan | 356/376 |
| 117102 | 6/1985 | Japan | 356/376 |
| 1478 | 1/1986 | Japan | 219/124.34 |

Primary Examiner—F. L. Evans
Attorney, Agent, or Firm—Frishauf, Holtz, Goodman & Woodward

[57] ABSTRACT

An apparatus for detecting a shape of a groove, comprises: a device for forming picture images of a groove and a groove face of a work piece of metal to be welded with the use of a welding arc as illuminating light; a storage device for storing information on picture elements of the picture images formed by the device for forming picture images; an integrating device for integrating the information of the picture elements stored in the storage device in a predetermined direction of a memory in the storage device; a differentiating device for differentiating the integrated information in the direction rectangular to the predetermined direction of the memory; and a detecting device for detecting information of shapes of the groove and the groove face on the basis of the differentiated information on the picture elements. The apparatus for detecting a shape of a groove is provided with a processing device which processes command values of welding current and of a welding speed on the basis of information on shapes of the groove and the groove face. The device for forming an image is provided with an air nozzle open toward an image forming area.

8 Claims, 6 Drawing Sheets

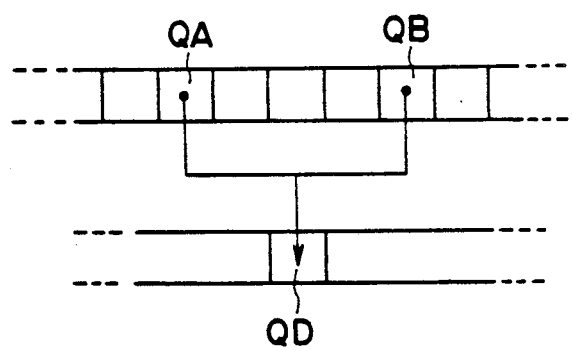

APPARATUS FOR DETECTING A SHAPE OF A GROOVE

BACKGROUND OF THE INVENTION

1. Field of the Invention

The present invention relates to an apparatus for detecting a shape of a groove, and more particularly to an apparatus for detecting a shape of a groove which processes an image formed by an image forming device.

2. Description of the Prior Art

A prior art apparatus for detecting a weld portion as shown below is disclosed in a Japanese Patent Application Laid Open No. 154771/86.

(a) Arc is observed with an optical system for observation;

(b) Linearly converging light beams are shot on a groove face in the vicinity of an arc point ahead of the formation of the arc point;

(c) An optical system for observation is arranged so that reflecting light beams of the linearly converging light can be observed with the above-mentioned optical system for observation simultaneously when the arc is observed; and (d) An arc image and an image formed by cutting the light beams shot on the groove come within the range of a detector for picking up a position of light beams in two dimensions and this makes it possible to detect simultaneously the arc image and the image formed by cutting the light beams shot on a groove in a simple constitution.

The prior art apparatus for detecting a weld position has disadvantages, however, in that a necessity for illuminating light source leads to an intricate constitution of the apparatus and to a complication of the adjustment of the apparatus. In addition, there is a possibility of a mixing of the illuminating light emitted from a light source with the arc light caused by welding. This makes an illumination unequal and leads to an unsatisfactory detection of the groove.

SUMMARY OF THE INVENTION

It is an object of the present invention to provide an apparatus for detecting a shape of a groove with high accuracy, no specific light source for illumination being needed and a bad influence of arc being prevented.

To accomplish the above-mentioned object, the present invention provides an apparatus for detecting a shape of a groove, which comprises:

means for forming images of a groove and a groove face of a work piece of metal to be welded;

Storing means for storing information on picture elements of the picture images formed by said means for forming the images, being constituted in two dimensions;

integrating means for integrating information on the picture elements stored in said storage means in a predetermined direction of a memory in said storage means;

differentiating means for differentiating the integrated information in the direction rectangular to the predetermined direction of the memory; and detecting means for detecting information on shapes of the groove and the groove face on the basis of the differentiated information on the picture elements.

The object and other objects and advantages of the present invention will become apparent from the detailed description to follow, taken in conjunction with the appended drawings.

BRIEF DESCRIPTION OF THE DRAWINGS

FIG. 10 is an explanation of the integration of the present invention; and

FIG. 11 is an explanation of the differentiation of the present invention.

DESCRIPTION OF THE PREFERRED EMBODIMENT

A total constitution of an apparatus for detecting a shape of a groove of the present invention will now be explained with specific reference to FIGS. 1 and 2.

Figure 1:
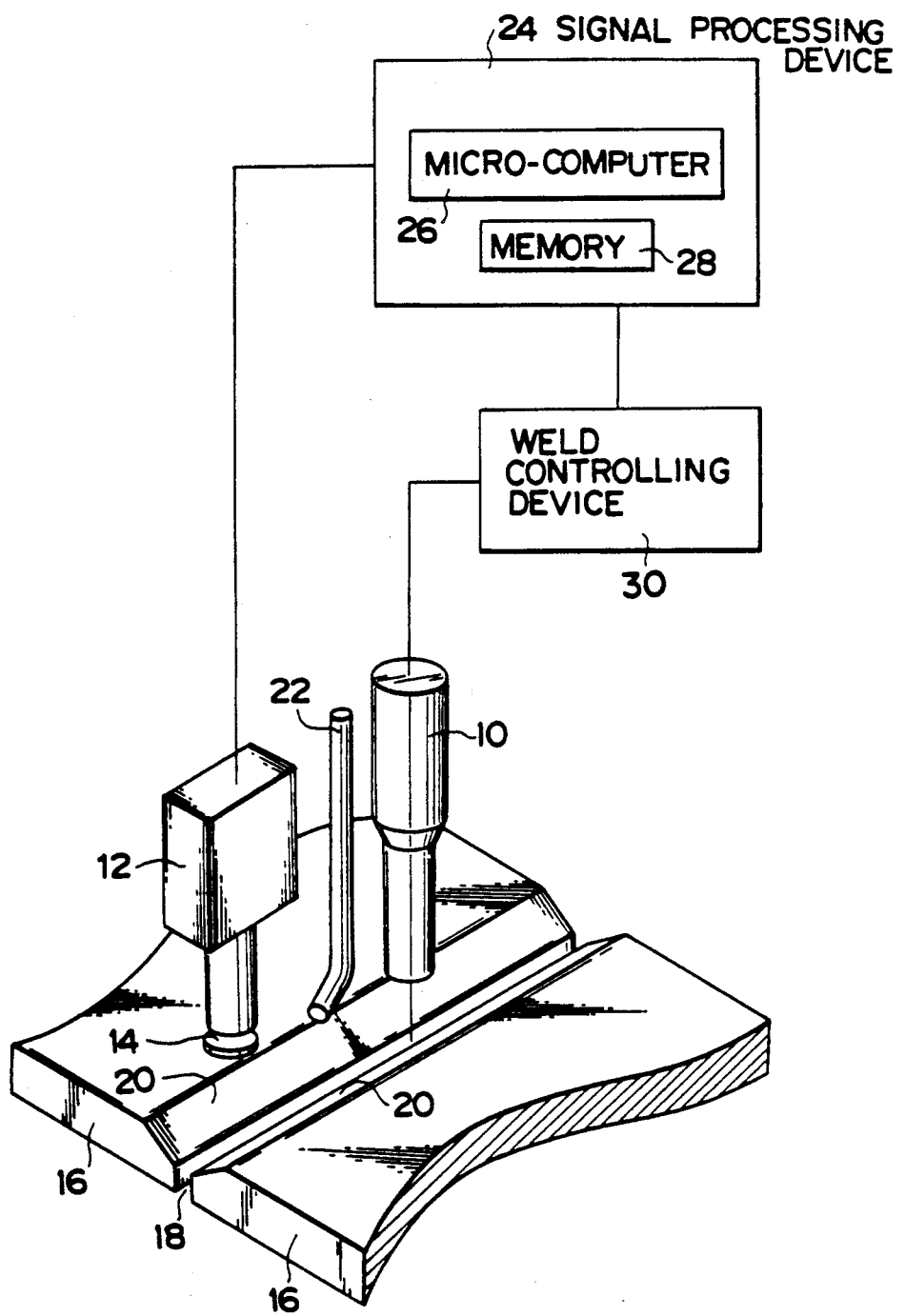
FIG. 1 is a perspective view illustrating an outline of an apparatus for detecting a shape of a groove of the present invention.
Figure 2:
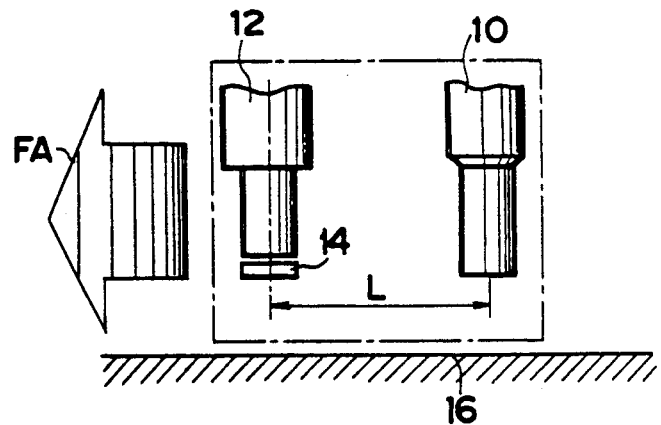
FIG. 2 is a side elevation showing schematically positions of a welding torch and an image forming device of the present invention.

FIG. 1 is a perspective view illustrating the outline of the apparatus for detecting a shape of a groove of the present invention. FIG. 2 is a side elevation illustrating the positions of a welding torch and an image forming device of the present invention. Two-dimensional image forming device 12 is set in the direction shown with an arrow symbol FA in which welding torch 10 moves. An extinction filter 14 is set on the side into which light beams of image forming device 12 come. Image forming device 12 is placed from 10 to 30 mm in front of a molten pool just under welding torch 10 so that the device can form an image of groove 18 and groove face 20 of a work piece of metal 16 to be welded. An arc light is used for the illuminating light in case of forming an image. Therefore, no special illuminating means is needed. Air nozzle 22 is set between welding torch 10 and image forming device 12. The end of air nozzle 22 is open toward the area in which image forming device 12 forms an image. Fumes occuring at the time of welding are removed by blowing air from air nozzle 22. As a result, a good image can be formed. A picture image signal which is an image forming output of image forming device 12 is inputted in signal processing device 24. Signal processing device 24 is composed of micro-computer 26 and memory 28. In signal processing device 24, a predetermined image processing of a specific area is carried out, and a position of a welding line, the center of the groove and the width of a root gap are detected. The results of processing in signal processing device 24 are inputted in weld controlling device 30, being delayed by a period of time corresponding to the distance L shown in FIG. 2. Weld controlling device 30 controls welding current, arc voltage, deposition amount, welding speed and the like.

Figure 3:
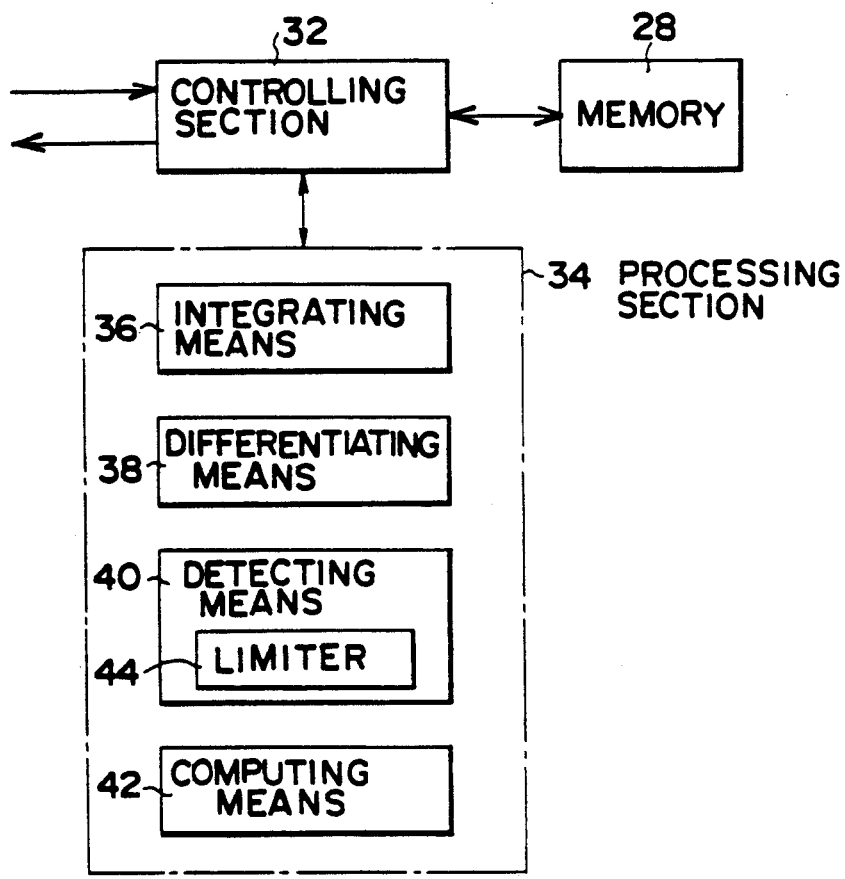
FIG. 3 is a block diagram showing a constitution of a signal processing device according to the present invention.

FIG. 3 is a block diagram showing a constitution of the signal processing device of the present invention. A picture image signal from image forming device 12 is inputted in controlling section 32. Controlling section 32 is connected to memory 28 and processing section 34 respectively. Processing section 34 is composed of integrating means 36, differentiating means 38, detecting means 40 and computing means 42.

Control section 32 has a function of storing in memory 28 a picture image signal to be inputted after the picture image signal has been subjected to A/D conversion, and a function of reading out the data of the predetermined area from memory 28 and of outputting the data with delay in weld controlling device 30. A period of time of the delay corresponds to the distance L shown in FIG. 2. Memory 28 is constituted in two dimensions. Any brightness or any quantity of light can be investigated by designating coordinate values X and Y.

In integrating means 36, integration is carried out by summing up the brightness of the picture elements lined up in a predetermined direction of memory 28. The reason why the integral process is carried out is to decrease an influence of a noise by coordinating contours of picture images.

Differentiating means 38 has a purpose of taking out the contours of the picture images by differentiating the integrated picture images.

Detecting means 40 and computing means 42 aim at obtaining information on a shape of groove 18 from the differentiated picture images. Detecting means 40 is provided with limiter 44. Limiter 44 is set to control a large fluctuation of detected positions due to a false detection.

In the preferred embodiment, an arc light is used as an illuminating light. Therefore, a luminous intensity of groove 18 which is a subject of image forming device 12 is unstable and varies constantly. Because of this, the picture images are not subjected to a binalizing process, but to the integrating process and the differentiating process.

Subsequently, the work of the apparatus for detecting a shape of a groove of the present invention will now be explained with specific reference to FIGS. 4 to 11.

Figure 4:
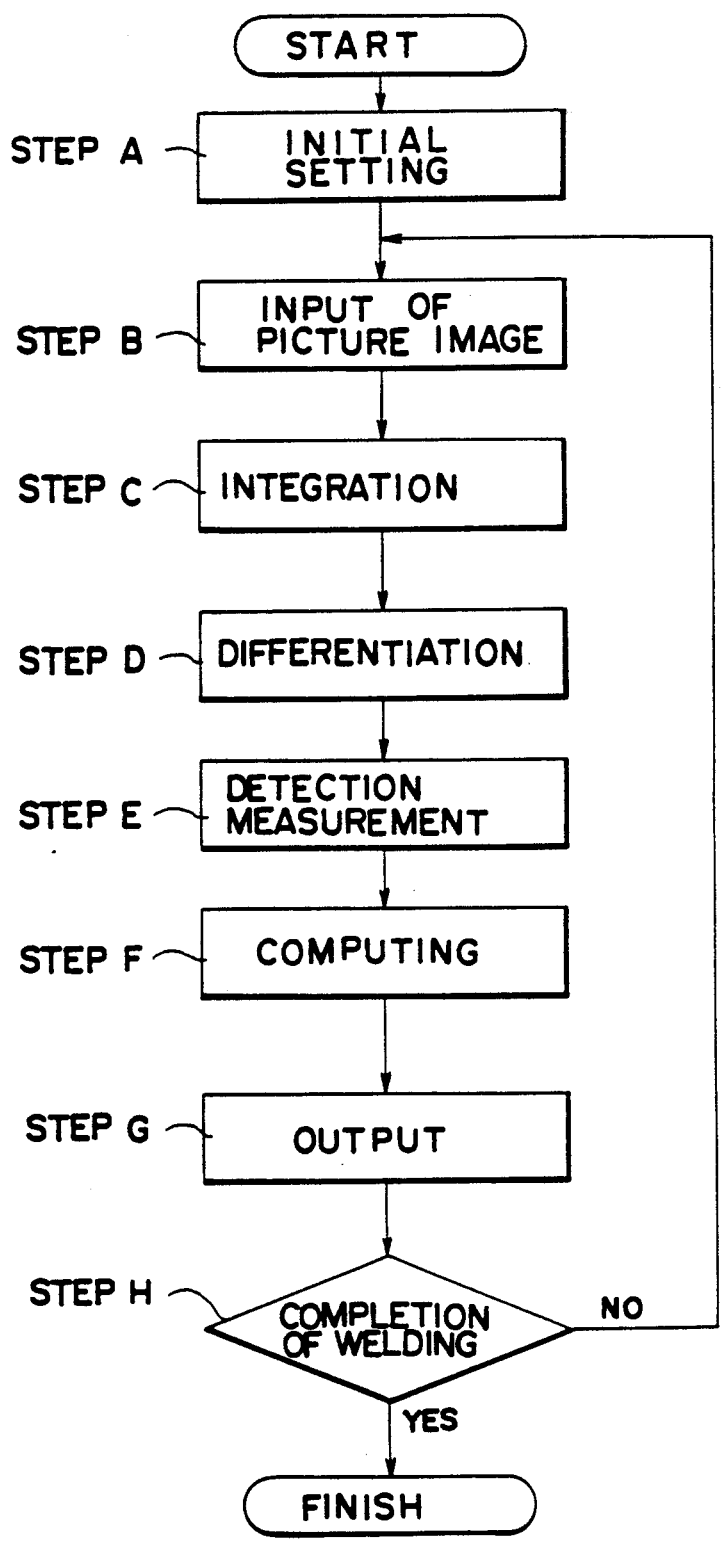
FIG. 4 is a flow chart showing the work of the apparatus for detecting a shape of a groove of the present invention.
Figure 5:
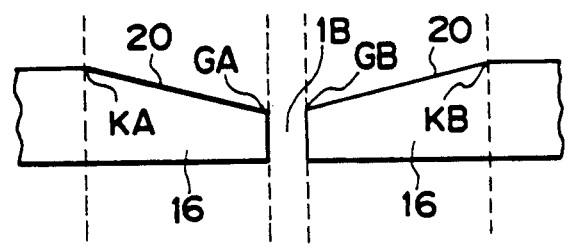
FIG. 5 is a view illustrating a groove of a work piece of metal to be welded according to the present invention.

FIG. 4 is a flow chart illustrating the work of the apparatus for detecting a shape of a groove of the present invention.

Figure 6:
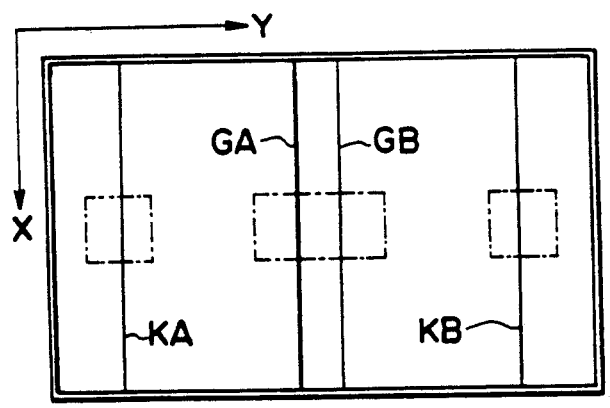
FIG. 6 is a view illustrating a typical an image when the image of the groove is formed by the image forming device of the present invention.

Step A (Initial setting):

An initial setting is carried out so that groove 18 can come within the range of image forming device 12. In image forming device 12, a picture image as shown in FIG. 6 is obtained relative to groove 18 of work piece of metal 16 to be welded shown in FIG. 5.

Step B (Input of picture image):

A picture image signal of groove 18 formed by image forming device 12 is subjected to A/D conversion by the control section and further stored in memory 28. In control section 32, only limited areas shown with dashed lines are set as processing areas. A picture element data in the areas is read out from memory 28 and the signal processing which follows is carried out.

Figure 7:
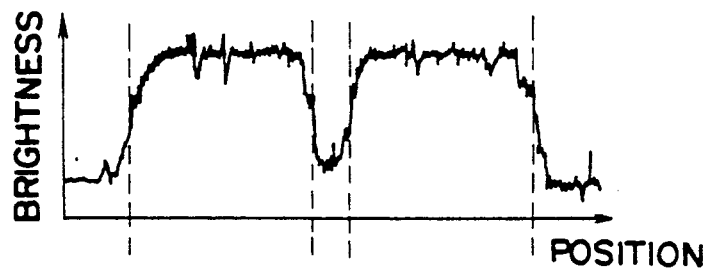
FIG. 7 is a graphic representation showing a distribution of brightness in the direction rectangular to a weld line of the present invention.
Figure 8:
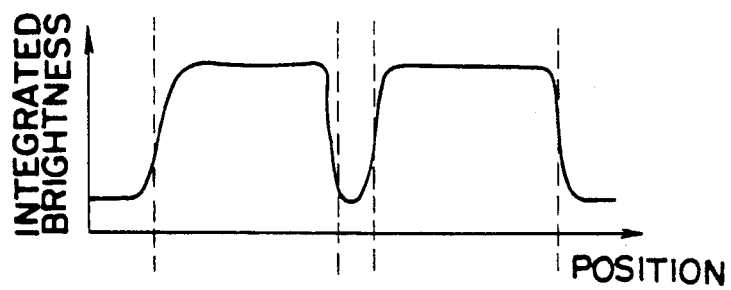
FIG. 8 is a graphic representation showing the distribution of the integrated brightness in the direction rectangular to the weld line according to the present invention.

Step C (Integration):

Relative to the brightness of the picture elements, a position integration is carried out by integrating means 36. FIG. 7 indicates a brightness data of each picture element at an appropriate coordinate value X. As shown in FIG. 7, the brightness is high in an opening face 20, but low in other positions. It is difficult, however, to satisfactorily detect the edge ends GA and GB of a root gap and shoulders KA and KB due to the influence of an optical noise. Accordingly, the position integration as shown in FIG. 10 is carried out. FIG. 10 is an explanation of an integration of the present invention. The integration is carried out by adding brightness data at the same coordinate Y in the direction of X. An integral value of picture element Q1 is, for example, a value obtained by summing up the brightness of picture elements Q11 to Q15. Integral values of picture elements Q2, Q3, Q4 ... can also be obtained in the same way. The position integration in the direction of X is carried out relative to the specified area designated with dashed lines in FIG. 6 and an integral data of the brightness as shown in FIG. 8 is obtained. The integration makes it possible to coordinate the contours of the picture images relative to the direction of X and to lower relatively a level of the optical noise.

Figure 9:
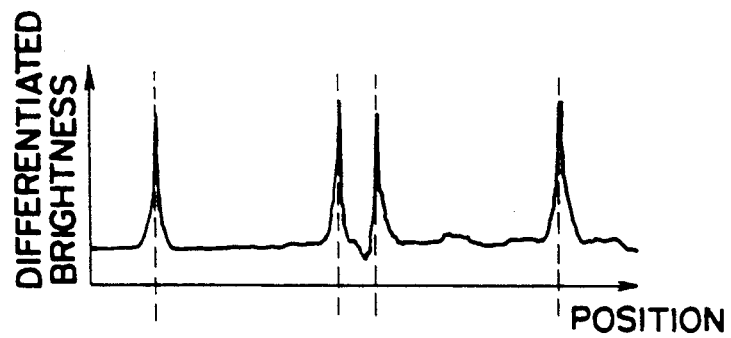
FIG. 9 is a graphic representation showing the distribution of the differentiated brightness by differentiating the distribution of the integrated brightness.

Step D (Differentiation):

Relative to the above-mentioned integrated data, the differentiation is carried out by differentiating means 38. As shown in FIG. 11, the differentiation is carried out by finding a difference (QA−QB) of the brightness between two picture elements (QA,QB), one of the two picture elements being located at the second left to a picture element to be found and the other at the second light to the picture element. Thus, a difference between AQ and QB becomes QD. The differentiated data found in the above-mentioned way is shown in FIG. 9. There are indicated vividly as peaks corresponding to the edge ends GA and GB of the root gap and to the shoulders KA and KB.

Step E (Detection, Measurement):

Relative to the data of the differential brightness found in the above-mentioned way, the positions of the edge ends GA and GB of the root gap and of the shoulders KA and KB are detected and the width of the root gap are measured. That is to say, the positions of the picture elements, whose differential values indicate maximum values relative to the area shown with the dashed lines in FIG. 6, are found and detected as the positions of the edge ends GA and GB of the root gap and the shoulders KA and KB. Limiter 44 is set so that the maximum picture elements of the differentiated values can correspond to the positions of the edge ends GA and GB of the root gap and of the shoulders KA and KB and that there cannot be any great fluctuation of the positions to be detected, even if the maximum picture element is affected. Limiter 44 predetermines a limit of the positions to be detected and absorbs the fluctuation of the positions exceeding the set values. Then, the width of the root gap is measured based on the positions of the edge ends GA and GB of the root gap.

Step F (Computing):

A welding current command value and a welding speed are processed by computing means 42 on the basis of the width of the root gap measured with the use of a predetermined conversion formula.

Step G (Output):

The welding data such as the welding current command value, the welding speed and the like, after having been stored once in memory 28 and delayed by a certain period of time, is outputted in weld controlling device 30 from controlling section 32. A difference L in distances between the position of the image formation and the welding position is removed. Accordingly, the welding current command and the welding speed command corresponding to the root gap located directly under welding torch 10 are issued.

Step H (Completion of welding):

Operations in Step A to G are repeated and completed when all the welding finishes.

Effects as described below are pointed out in preferred embodiment of the present invention.

(a) A speed-up and stabililzation of processing the formed picture images can be attained because the formed picture images are processed within their predetermined range;

(b) A welding arc is used as illuminating light for a groove portion. However, an influence of a noise is reduced and this makes it possible to detect the positions of the root gap and the shoulders owing to the signal processing with the use of integration and differentiation; and (c) Great errors in the detection of the positions of the root gap and the shoulders cannot occur because the positions of the root gap and the shoulders are detected within the predetermined range of their positions and limited;

(d) Welding conditions correspond well to the width of the root gap because the data is outputted, a difference between the position of the image formation and the position of the welding being taken into consideration.

The present invention is not confined to the above-mentioned preferred embodiment. For example, there is carried out, as an integration, the position integration of the brightness of the adjacent picture elements at the same time. However, a time integration, in which the same picture elements are integrated by time, can be carried out. Further, the above-mentioned signal processing can be carried out by means of a software with the use of a computer. The signal processing can be carried out, however, by means of a hardware by constituting a circuit for exclusive use.

What is claimed is:

1. An apparatus for detecting a shape of a groove, comprising:

means for forming picture images of a groove and a groove face of a work piece of metal to be welded using a welding arc as illuminating light, said picture images each including a plurality of picture elements;

storage means for storing information corresponding to picture elements of the picture images formed by said means for forming picture images, said information being constituted in two dimensions;

integrating means for integrating the information corresponding to the picture elements stored in said storage means in a predetermined direction of a memory in said storage means;

differentiating means for differentiating the integrated information in a direction substantially perpendicular to the predetermined direction of the memory; and detecting means for detecting information on shapes of the groove and groove face on the basis of the differentiated information on the picture elements.

2. The apparatus for detecting a shape of a groove of claim 1, wherein said integrating means includes means for integrating the brightness of the picture elements in the direction of a welding line.

3. The apparatus for detecting a shape of a groove of claim 1, wherein said integrating means includes means for integrating only the information on the picture elements of the portions of root gaps and shoulders stored in said storage means in a predetermined direction of a memory in said storage means.

4. The apparatus for detecting a shape of a groove of claim 1, wherein said differentiating means includes means for differentiating the integrated brightness of the picture elements in a direction substantially perpendicular to a welding line.

5. The apparatus for detecting a shape of a groove of claim 1, wherein said detecting means includes means for detecting positions of root gaps and shoulders as picture elements having a maximum differentiated value.

6. The apparatus for detecting a shape of a groove of claim 5, further comprising means for limiting the detected positions of the root gaps and the shoulders.

7. The apparatus for detecting a shape of a groove of claim 1, further comprising means for computing a command value of a welding current and a command value of a welding speed on the basis of information on shapes of the groove and the groove face.

8. The apparatus for detecting a shape of a groove of claim 1, wherein said means for forming an image includes an air nozzle open toward an image forming area.

* * * * *